United States Patent
Choi

(10) Patent No.: US 9,174,605 B2
(45) Date of Patent: Nov. 3, 2015

(54) PEDESTRIAN AIRBAG CUSHION

(71) Applicant: Hyundai Motor Company, Seoul (KR)

(72) Inventor: Jae Ho Choi, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/313,925

(22) Filed: Jun. 24, 2014

(65) Prior Publication Data

US 2015/0175121 A1    Jun. 25, 2015

(30) Foreign Application Priority Data

Dec. 19, 2013  (KR) .................. 10-2013-0159543

(51) Int. Cl.
*B60R 21/36* (2011.01)
*B60R 21/34* (2011.01)

(52) U.S. Cl.
CPC ........... *B60R 21/36* (2013.01); *B60R 2021/346* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,182,782 B1 * | 2/2001 | Matsuura et al. | ............ | 180/274 |
| 6,880,666 B2 * | 4/2005 | Kikuchi et al. | ............ | 180/274 |
| 6,955,238 B2 * | 10/2005 | Takimoto | ............ | 180/274 |
| 7,172,048 B2 * | 2/2007 | Hamada et al. | ............ | 180/274 |
| 7,845,454 B2 * | 12/2010 | Takimoto et al. | ............ | 180/274 |
| 7,997,614 B2 * | 8/2011 | Ishikawa et al. | ............ | 280/739 |
| 8,016,066 B1 * | 9/2011 | Boxey | ............ | 180/271 |
| 8,104,563 B2 * | 1/2012 | Narita et al. | ............ | 180/274 |
| 8,727,061 B2 * | 5/2014 | Rydsmo et al. | ............ | 180/274 |
| 2006/0151228 A1 * | 7/2006 | Kalliske et al. | ............ | 180/274 |
| 2009/0001691 A1 * | 1/2009 | Takimoto et al. | ............ | 280/728.1 |
| 2009/0102167 A1 * | 4/2009 | Kitte et al. | ............ | 280/728.2 |
| 2009/0120708 A1 | 5/2009 | Takimoto | | |
| 2013/0221647 A1 | 8/2013 | Ivenz et al. | | |
| 2014/0027195 A1 * | 1/2014 | Kalliske et al. | ............ | 180/271 |

FOREIGN PATENT DOCUMENTS

| | | | | | |
|---|---|---|---|---|---|
| DE | 10220364 | A1 * | 12/2003 | ............ | B60R 21/16 |
| DE | 102011100114 | A1 * | 11/2011 | | |
| DE | 102011013495 | A1 * | 4/2012 | | |
| DE | 102011114297 | A1 * | 3/2013 | | |
| DE | 102012200805 | A1 * | 7/2013 | | |
| DE | 102012003746 | A1 * | 8/2013 | | |
| DE | 102012222006 | A1 * | 8/2013 | | |
| DE | 102012006428 | A1 * | 10/2013 | | |
| DE | 202012011053 | U1 * | 4/2014 | | |
| EP | 2492156 | A1 * | 8/2012 | | |
| EP | 2524843 | A1 * | 11/2012 | | |
| EP | 2548772 | A1 * | 1/2013 | | |
| EP | 2570307 | A1 * | 3/2013 | | |

(Continued)

*Primary Examiner* — Nicole Verley
(74) *Attorney, Agent, or Firm* — Morgan, Lewis & Bockius LLP

(57) ABSTRACT

Disclosed is a pedestrian airbag cushion. The pedestrian airbag cushion includes a cushion inflated to cover a windshield glass by an inflator, with a vent hole formed in the cushion. A tether is provided on a portion of the cushion corresponding to a driver's seat and is connected at a first end to an upper portion of the cushion. The tether extends downwards and is connected at a second end to a lower portion of the cushion. The tether has a contractive force to pull the portion of the cushion corresponding to the driver's seat downwards after the cushion is deployed.

11 Claims, 5 Drawing Sheets

(56) References Cited

FOREIGN PATENT DOCUMENTS

| | | | | |
|---|---|---|---|---|
| EP | 2607183 A1 * | 6/2013 | | |
| FR | 2914022 A1 * | 9/2008 | ........... | F02M 35/024 |
| JP | 2006-44569 A | 2/2006 | | |
| JP | 2007-76542 A | 3/2007 | | |
| KR | 10-2013-0100370 A | 9/2013 | | |
| WO | WO 2012101198 A1 * | 8/2012 | | |

\* cited by examiner

*100, 200*

*100, 200*

*100, 200*

PEDESTRIAN AIRBAG CUSHION

CROSS-REFERENCE(S) TO RELATED APPLICATION

The present application claims priority of Korean Patent Application Number 10-2013-0159543 filed on Dec. 19, 2013, the entire contents of which application are incorporated herein for all purposes by this reference.

BACKGROUND OF INVENTION

1. Field of Invention

The present invention relates to a restoring structure for an airbag cushion that is deployed from a vehicle to protect a pedestrian, and, more particularly, to a pedestrian airbag cushion, which is configured to automatically restore and fold the cushion after the deployment of the cushion so as not to obstruct a driver's field of vision after the deployment, thus being capable of preventing a secondary collision after a pedestrian accident.

2. Description of Related Art

In order to efficiently prevent injuries when a pedestrian is struck by a vehicle and thus his or her head collides with a vehicle hood or a cowl part, a sensor mounted on a bumper detects the presence of the pedestrian and then transmits a signal. In response to the signal, the airbag mounted to a lower end of the vehicle hood is deployed to a windshield and an A pillar, thus protecting the pedestrian's head.

The airbag deployed in this way is intended to prevent the pedestrian's head from directly colliding with a stiff part of the vehicle, such as the cowl part or the A pillar of the vehicle.

However, such a pedestrian airbag is problematic in that, even if the deployed airbag is vented, it is difficult to sufficiently secure a driver's field of vision, thus causing a secondary collision due to a lack of his or her field of vision.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a restoring structure for an airbag cushion that is deployed from a vehicle to protect a pedestrian, and to provide a pedestrian airbag cushion, which is configured to automatically restore and fold the cushion after the deployment of the cushion so as not to obstruct a driver's field of vision after the deployment, thus being capable of preventing a secondary collision after a pedestrian accident.

In order to solve the above and/or other problems, according to various aspects of the present invention, there is provided a pedestrian airbag cushion, including a cushion inflated to cover a windshield glass by an inflator, with a vent hole formed therein, and a tether provided on a portion of the cushion corresponding to a driver's seat, connected at a first end thereof to an upper portion of the cushion, extending downwards and connected at a second end thereof to a lower portion of the cushion, the tether having a contractive force to pull the portion of the cushion corresponding to the driver's seat downwards after the cushion is deployed.

The vent hole may be closed at an initial deploying stage and may be opened during a deployment. The vent hole may be of an active vent type that allows a vent time to be set.

The tether may be provided on from the portion of the cushion corresponding to the driver's seat to a portion of the cushion corresponding to a passenger seat. The tether may have a shape of a band that connects the upper and lower portions of the cushion to each other, the tether comprising a plurality of tethers that is spaced apart from each other. The tether may be a plate spring that is rolled originally substantially in a circular form and restored substantially to an original state thereof after the cushion is vented. The tether may extend along an outer surface of the cushion, and may be connected at both ends thereof to upper and lower ends of the cushion, respectively. The tether may extend along an inner surface of the cushion, and may be connected at both ends thereof to upper and lower ends of the cushion, respectively.

The portion of the cushion corresponding to the driver's seat may independently form a driver's seat chamber, and the tether may be provided in the driver's seat chamber, so that only the driver's seat chamber is contracted after internal gas is vented. Adjacent chambers may be formed to overlap each other when the cushion is deployed in a thickness direction.

The portion of the cushion corresponding to the driver's seat and the portion of the cushion corresponding to the passenger seat may be independently configured to form independent chambers, and the tether may be provided in each of the independent chambers so that only the independent chambers are contracted after internal gas is vented.

As is apparent from the above description, the pedestrian airbag cushion is advantageous in that this invention is directed to a restoring structure for an airbag cushion that is deployed from a vehicle to protect a pedestrian, and the pedestrian airbag cushion is configured to automatically restore and fold the cushion after the deployment of the cushion so as not to obstruct a driver's field of vision after the deployment, thus being capable of preventing a secondary collision after a pedestrian accident.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
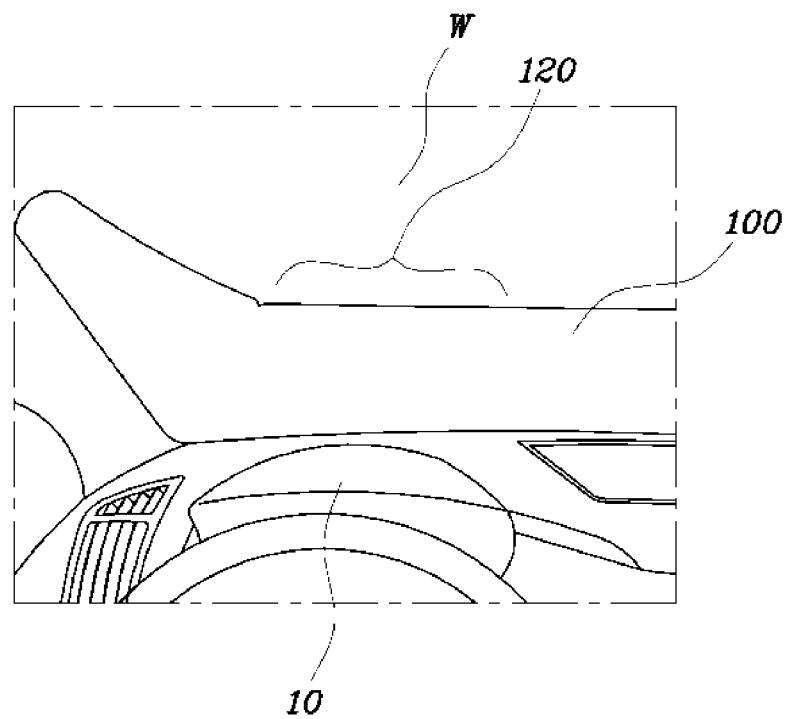
FIG. 1 is a view showing the deployment of an exemplary pedestrian airbag cushion according to the present invention.
Figure 4:
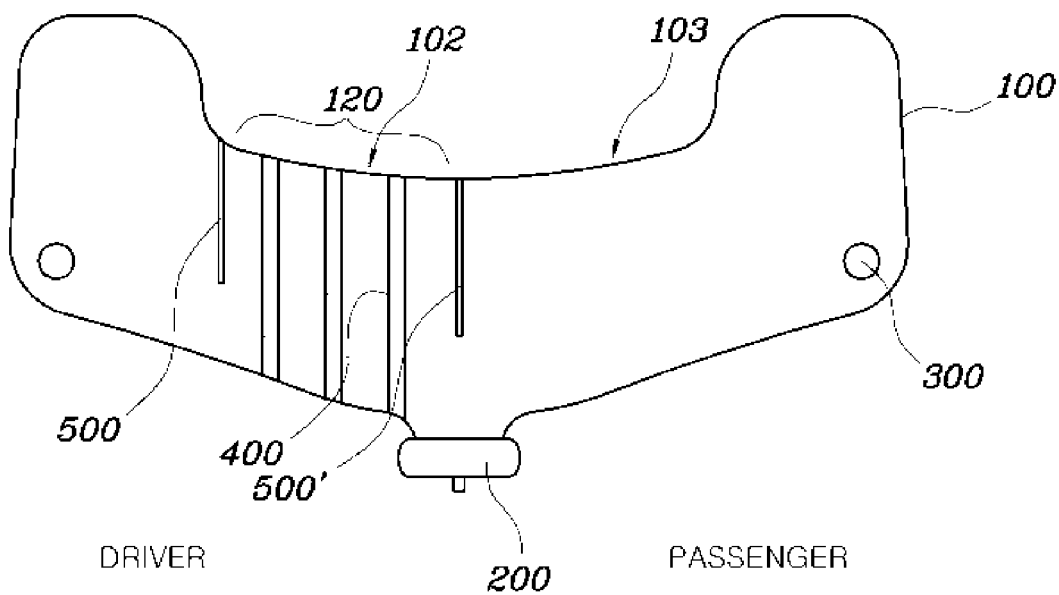
FIG. 4 is a view showing various exemplary pedestrian airbag cushions according to the present invention.
Figure 5:
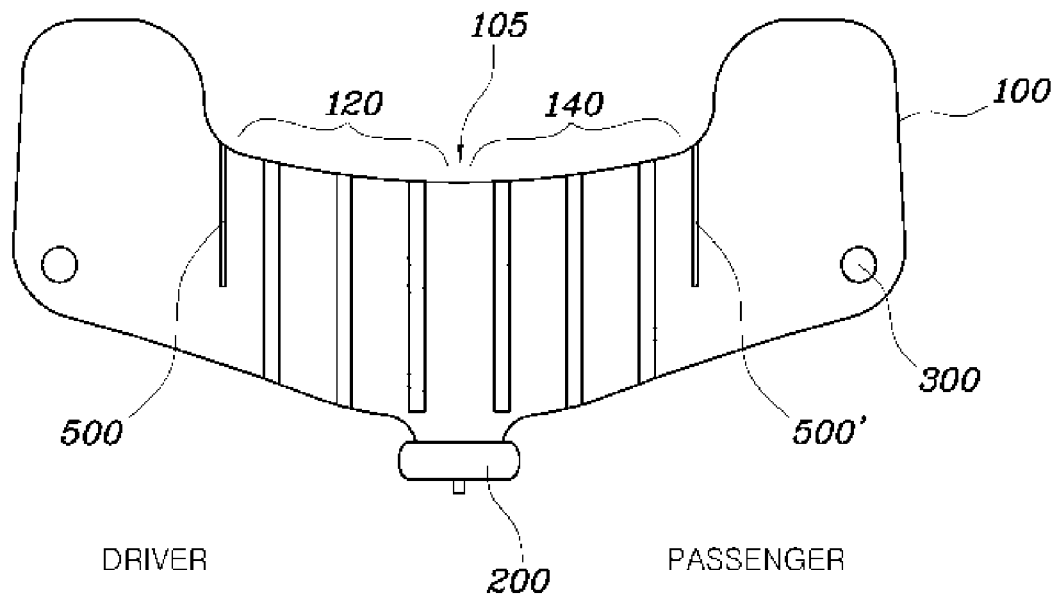
FIG. 5 is a view showing various exemplary pedestrian airbag cushions according to the present invention.
Figure 6:
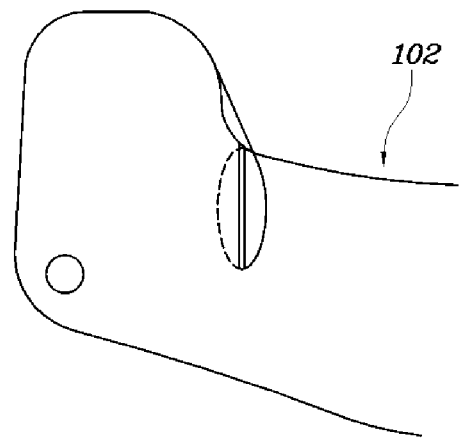
FIGS. 6 and 7 are views showing the overlapping of chambers of an exemplary pedestrian airbag cushion according to the present invention.
Figure 7:
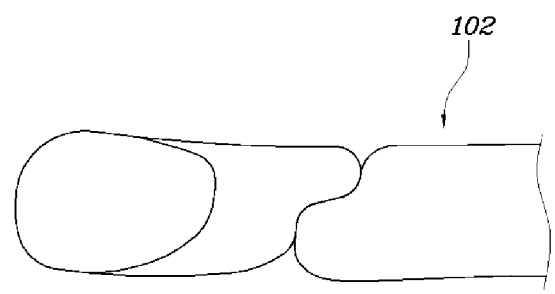
Figure 8:
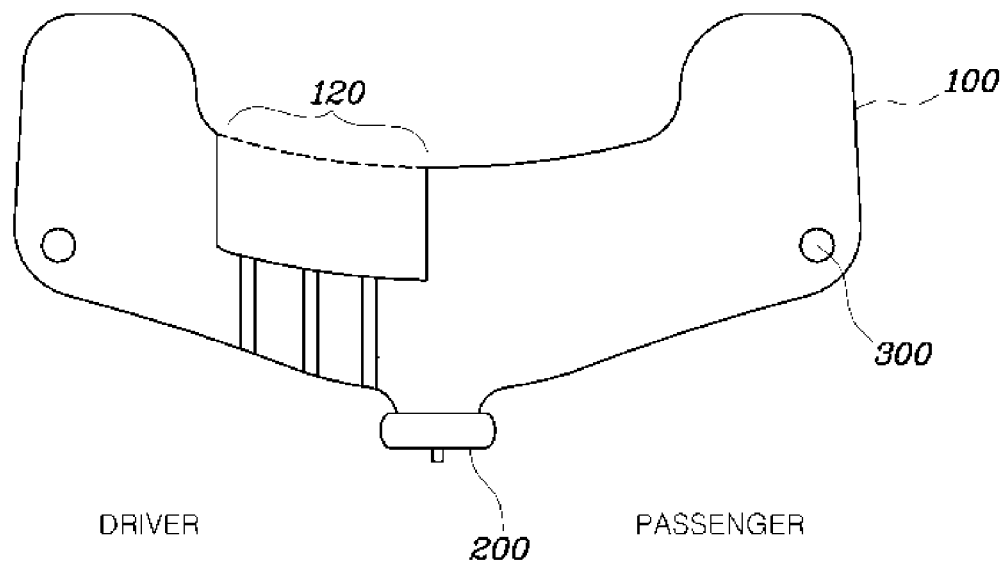
FIGS. 8 and 9 are views showing the contracted state of an exemplary pedestrian airbag cushion according to the present invention.
Figure 9:
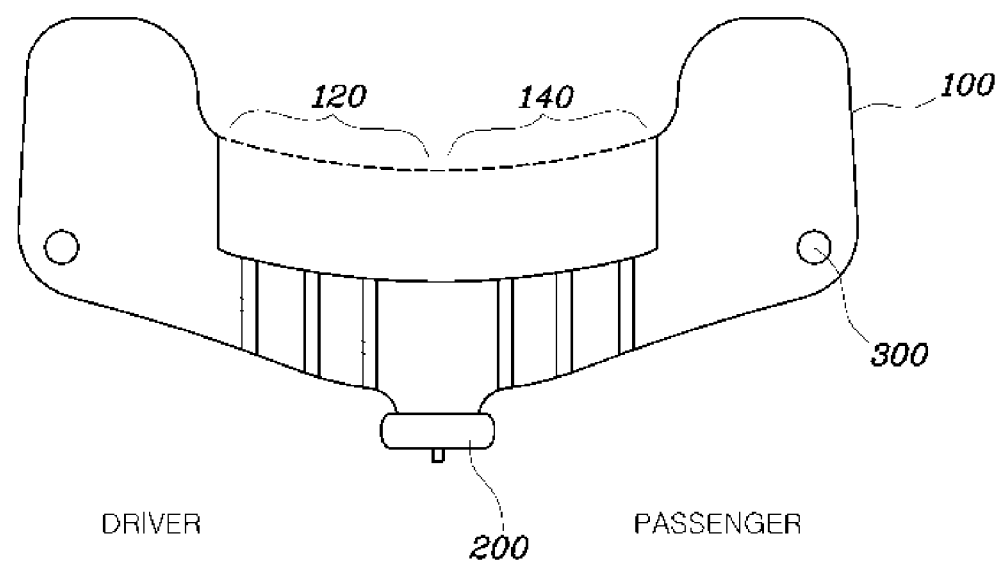

FIG. 1 is a view showing the deployment of a pedestrian airbag cushion, FIGS. 2 to 5 are views showing various pedestrian airbag cushions, FIGS. 6 and 7 are views showing the overlapping of chambers of the pedestrian airbag cushion, FIGS. 8 and 9 are views showing the contracted state of the pedestrian airbag cushion, and FIGS. 10A to 10D are views showing the operation of the pedestrian airbag cushion according to various embodiments of the present invention.

A pedestrian airbag is deployed from a hood and covers a windshield glass and a pillar, thus preventing an injury of a pedestrian due to a collision. However, in this case, the deployed airbag still blocks a driver's field of vision, so that there is a risk of a secondary accident. The reason is because, despite a vent formed in the cushion, it takes time to discharge gas contained therein.

Thus, in order to solve the problem and/or other problems, a pedestrian airbag cushion according to the present invention is configured so that an elastic body is coupled to the cushion. To be more specific, as shown in FIG. 1, the cushion 100 is inflated by an inflator to cover a windshield glass W, with a vent hole 300 formed in the cushion 100. Such a vent hole of the cushion may be a typical hole, and is preferably closed at an initial deployment stage and opened as the cushion is deployed. Particularly, in some embodiments, an active vent type is preferred, which is to enable the setting of a vent timing using a separate explosive. The active vent type does not perform a venting operation until the cushion is fully inflated, thus helping the cushion be rapidly deployed, and performs the venting operation after the cushion has been fully inflated, thus allowing gas to be discharged. Since the active vent type may be one that is used for various types of vehicles, a detailed description thereof will be omitted herein.

Further, a tether is provided in a portion 120 of the cushion 100 corresponding to a driver's seat 10. To be more specific, one end of the tether is connected to an upper end of the cushion 100, while the other end extends downwards to be connected to a lower end of the cushion 100. Since the tether itself has a contractive force, it pulls an upper portion of the cushion 100 so that the portion 120 of the cushion 100 corresponding to the driver's seat 10 is rapidly contracted downwards after the cushion has been deployed.

Figure 2:
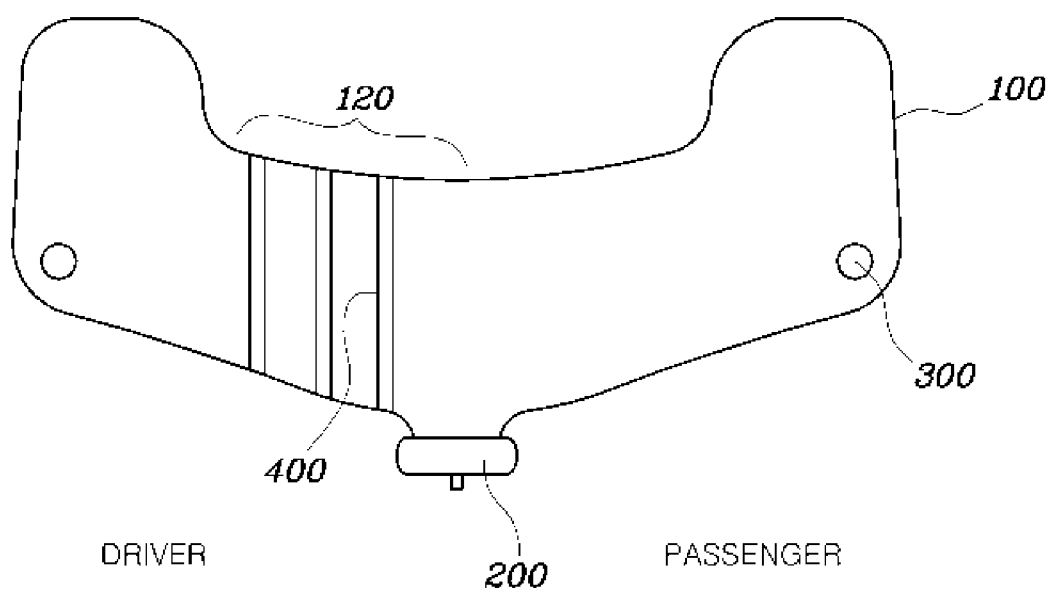
FIG. 2 is a view showing various exemplary pedestrian airbag cushions according to the present invention.
Figure 3:
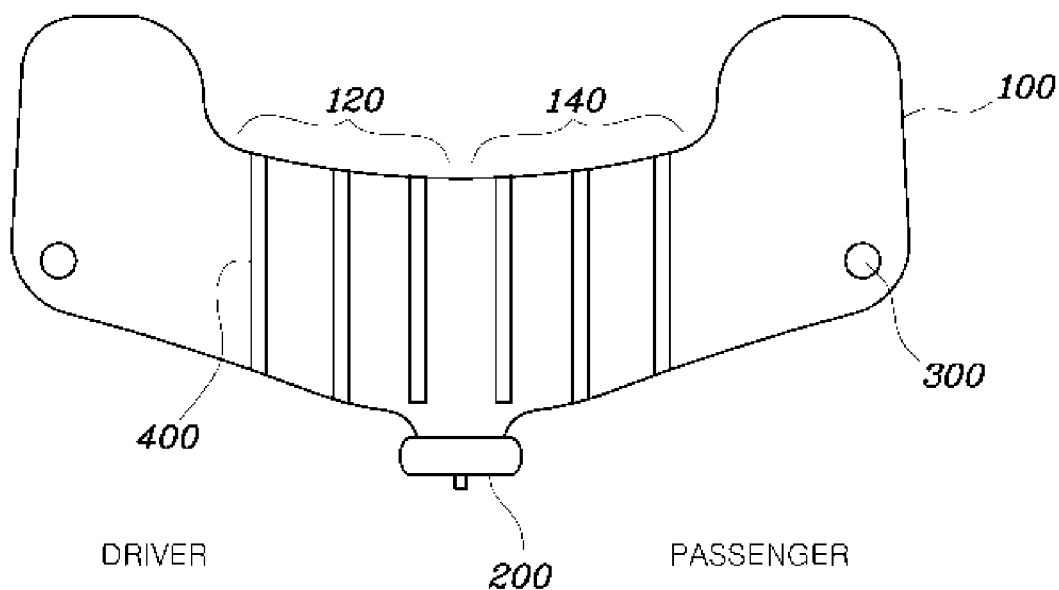
FIG. 3 is a view showing various exemplary pedestrian airbag cushions according to the present invention.

FIG. 2 shows the state where the tether 400 is installed in the portion 120 of the cushion 100 corresponding to the driver's seat 10. The tether 400 allows the portion 120 of the cushion 100 corresponding to the driver's seat 10 to be contracted more rapidly than the remaining portions after the cushion 100 has been deployed, thus securing a driver's field of vision. FIG. 3 shows the state where a wider view can be secured by pulling both the portion 120 corresponding to the driver's seat 10 and a portion 140 corresponding to a passenger seat with the tether 400.

FIGS. 10A to 10D are views illustrating the operation of such a tether. Here, the tether may be a plate spring that is rolled such as in a circular form and is restored to its original state. Further, the tether has the shape of a band that connects the upper and lower ends of the cushion with each other. The tether may comprise a plurality of tethers that are spaced apart from each other.

Further, the tether may extend along an outer surface of the cushion and then be connected at both ends thereof to the upper and lower ends of the cushion. The tether may extend along an inner surface of the cushion and then be connected at both ends thereof to the upper and lower ends of the cushion.

Figure 10A:
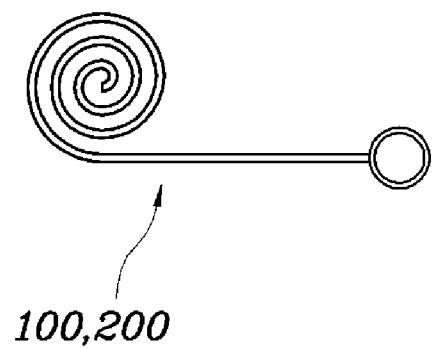
FIG. 10A is a view showing the operation of an exemplary pedestrian airbag cushion according to the present invention.
Figure 10B:
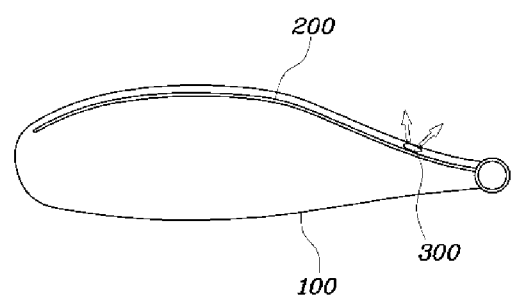
FIG. 10B is a view showing the operation of an exemplary pedestrian airbag cushion according to the present invention.
Figure 10C:
FIG. 10C is a view showing the operation of an exemplary pedestrian airbag cushion according to the present invention.
Figure 10D:
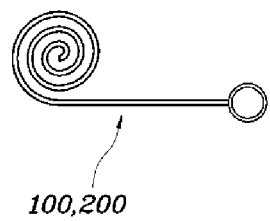
FIG. 10D is a view showing the operation of an exemplary pedestrian airbag cushion according to the present invention.

As shown in FIG. 10A, the tether is normally kept rolled along with the cushion. As shown in FIG. 10B, the tether is deployed at the same time as the cushion is deployed. When the cushion is vented as shown in FIG. 10C, the tether is rolled again along with the cushion as shown in FIG. 10D. Thus, the contractive force of the tether should be smaller than the expansive force of the inflator that is needed to deploy the cushion.

As shown in FIG. 4, the cushion 100 is configured such that the portion corresponding to the driver's seat independently constitutes a driver's seat chamber 102 and the tether 400 is provided in the driver's seat chamber 102, thus allowing only the driver's seat chamber 102 to be contracted after internal gas is vented. Further, as shown in FIG. 5, the cushion 100 may be configured such that both the portions corresponding to the driver's seat and the passenger seat constitute independent chambers 105. Separating lines 500 and 500' are provided to make the respective chambers be independent of each other, and lower ends thereof are connected to each other to share gas. Such a configuration allows the tether 400 to be more easily contracted. Further, the contractive force of the tether 400 may be designed to be smaller, thus allowing the cushion 100 to be more efficiently deployed.

FIGS. 8 and 9 are views showing the contracted state of the pedestrian airbag cushion according to various embodiments of the present invention. As such, only the chamber provided with the tether 400 is independently contracted.

Meanwhile, the adjacent chambers may be formed to overlap each other when the cushion is deployed in a thickness direction, as shown in FIGS. 6 and 7. Such a configuration can sufficiently protect a pedestrian even if he or she is loaded on the independent separating lines 500 and 500' of the chambers.

For convenience in explanation and accurate definition in the appended claims, the terms "upper" or "lower", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedestrian airbag cushion for a vehicle including a windshield glass, an inflator, and a driver seat, comprising:
   a cushion inflated to cover the windshield glass by the inflator, with a vent hole formed therein; and
   a tether provided on a portion of the cushion corresponding to the driver seat, connected at a first end thereof to an upper portion of the cushion, extending downwards and connected at a second end thereof to a lower portion of the cushion, the tether having a contractive force to pull the portion of the cushion corresponding to the driver seat downwards after the cushion is deployed,
   wherein the portion of the cushion corresponding to the driver seat independently forms a driver seat chamber, and the tether is provided in the driver seat chamber, so that only the driver seat chamber is contracted after internal gas is vented, and
   wherein separating lines are provided at both sides of the driver seat chamber to separate the driver seat chamber from the portion of the cushion corresponding to the driver seat.

2. The pedestrian airbag cushion as set forth in claim 1, wherein the vent hole is closed at an initial deploying stage and is opened during a deployment.

3. The pedestrian airbag cushion as set forth in claim 1, wherein the vent hole is of an active vent type that allows a vent time to be set.

4. The pedestrian airbag cushion as set forth in claim 1, wherein the tether is provided on from the portion of the cushion corresponding to the driver seat to a portion of the cushion corresponding to a passenger seat.

5. The pedestrian airbag cushion as set forth in claim 1, wherein the tether has a shape of a band that connects the upper and lower portions of the cushion to each other, the tether comprising a plurality of tethers that are spaced apart from each other.

6. The pedestrian airbag cushion as set forth in claim 1, wherein the tether comprises a plate spring that is rolled originally substantially in a circular form and restored substantially to an original state thereof after the cushion is vented.

7. The pedestrian airbag cushion as set forth in claim 1, wherein the tether extends along an outer surface of the cushion, and is connected at both ends thereof to upper and lower ends of the cushion, respectively.

8. The pedestrian airbag cushion as set forth in claim 1, wherein the tether extends along an inner surface of the cushion, and is connected at both ends thereof to upper and lower ends of the cushion, respectively.

9. The pedestrian airbag cushion as set forth in claim 1 wherein adjacent chambers are formed to overlap each other when the cushion is deployed in a thickness direction.

10. A pedestrian airbag cushion for a vehicle including a windshield glass, an inflator, a driver seat, and a passenger seat, comprising:
    a cushion inflated to cover the windshield glass by the inflator, with a vent hole formed therein; and
    a tether provided on a portion of the cushion corresponding to the driver seat, connected at a first end thereof to an upper portion of the cushion, extending downwards and connected at a second end thereof to a lower portion of the cushion, the tether having a contractive force to pull the portion of the cushion corresponding to the driver seat downwards after the cushion is deployed,
    wherein the portion of the cushion corresponding to the driver seat and the portion of the cushion corresponding to the passenger seat are independently configured to form independent chambers, and the tether is provided in each of the independent chambers so that only the independent chambers are contracted after internal gas is vented, and
    wherein separating lines are provided at both outer sides of the independent chambers to separate the independent chambers from the portion of the cushion corresponding to the driver seat and the portion of the cushion corresponding to the passenger seat.

11. The pedestrian airbag cushion as set forth in claim 10, wherein adjacent chambers are formed to overlap each other when the cushion is deployed in a thickness direction.

* * * * *